US011326571B2

(12) United States Patent
Doering et al.

(10) Patent No.: US 11,326,571 B2
(45) Date of Patent: May 10, 2022

(54) METHODS AND SYSTEM FOR ADAPTIVELY SWITCHING AN ENGINE STARTING DEVICE

(71) Applicant: Ford Global Technologies, LLC, Dearborn, MI (US)

(72) Inventors: Jeffrey Doering, Canton, MI (US); James A. Hilditch, Canton, MI (US); John Rollinger, Troy, MI (US); Walter Joseph Ortmann, Saline, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/983,224

(22) Filed: Aug. 3, 2020

(65) Prior Publication Data
US 2022/0034287 A1    Feb. 3, 2022

(51) Int. Cl.
| F02N 11/08 | (2006.01) |
| F02N 11/04 | (2006.01) |
| F02N 11/00 | (2006.01) |
| G07C 5/02 | (2006.01) |
| F16H 63/50 | (2006.01) |
| F16H 61/02 | (2006.01) |

(52) U.S. Cl.
CPC ........... *F02N 11/08* (2013.01); *F02N 11/006* (2013.01); *F02N 11/04* (2013.01); *F16H 61/0213* (2013.01); *F16H 63/50* (2013.01); *G07C 5/02* (2013.01); *F02N 2200/02* (2013.01); *F02N 2200/0801* (2013.01); *F02N 2200/0802* (2013.01); *F02N 2200/101* (2013.01); *F16H 2061/0223* (2013.01)

(58) Field of Classification Search
CPC ........ F02N 11/08; F02N 11/006; F02N 11/04; F02N 2200/02; F02N 2200/0801; F02N 2200/101; F16H 61/0213; F16H 63/50; F16H 2061/0223; G07C 5/02
USPC .......................................................... 123/179.4
See application file for complete search history.

(56) References Cited

U.S. PATENT DOCUMENTS

| 6,396,165 | B1 * | 5/2002 | Nagano ................... F02N 11/04 |
| | | | 307/10.6 |
| 7,099,768 | B2 | 8/2006 | Moriya |
| 10,252,712 | B2 | 4/2019 | Ossareh et al. |
| 10,315,647 | B2 | 6/2019 | Kim |
| 10,961,970 | B1 * | 3/2021 | Lew ........................ F01N 3/021 |
| 2016/0009271 | A1 | 1/2016 | Choi et al. |
| 2016/0032880 | A1 * | 2/2016 | Lovett .................... B60K 6/547 |
| | | | 701/22 |

(Continued)

FOREIGN PATENT DOCUMENTS

| EP | 1077328 A | 2/2001 |
| JP | H06200791 A | 7/1994 |

*Primary Examiner* — Mahmoud Gimie
(74) *Attorney, Agent, or Firm* — David Kelley; McCoy Russell LLP

(57) ABSTRACT

A method and system for operating a vehicle that includes a plurality of engine starting devices and an internal combustion engine is described. In one example, the method selects one of a plurality of engine starting devices to start an engine based on durability metrics of each of the plurality of engine starting devices. In addition, engine starting device selection may be based on calibration parameters that are generated via a server that is external to the vehicle.

17 Claims, 8 Drawing Sheets

(56) References Cited

U.S. PATENT DOCUMENTS

2018/0050685 A1* 2/2018 Atluri .................. B60K 6/40

* cited by examiner

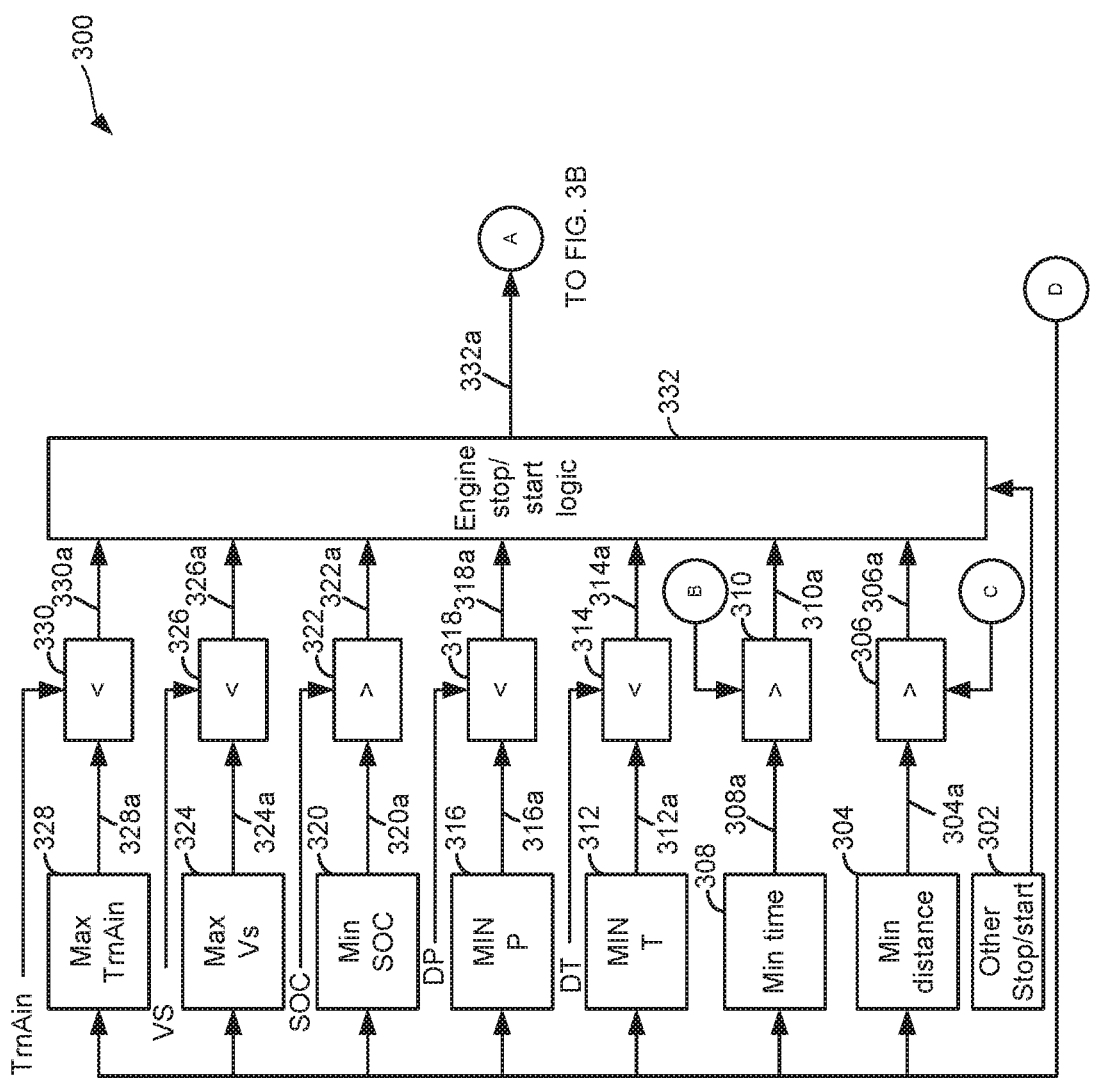

METHODS AND SYSTEM FOR ADAPTIVELY SWITCHING AN ENGINE STARTING DEVICE

FIELD

The present description relates to methods and a system for adaptively switching which of a plurality of engine starting devices is selected to start an engine. The methods and systems may be suitable for vehicles that include more than one engine starting device.

BACKGROUND AND SUMMARY

An engine of a vehicle may be pulled-up (e.g., engine rotational speed is increased to a cranking speed to facilitate combustion with the engine) or started so that the engine may propel the vehicle and/or to charge an electric energy storage device. The engine may be pulled-up or started via one of a plurality of engine starting devices. For example, the engine may be started via a low voltage starter, a belt integrated starter/generator, or an integrated starter/generator. However, if the vehicle is operated in an atypical way, one or more of the engine starting devices may be applied to start the engine more than may be expected. Consequently, the one or more engine starting devices may enter a degraded state sooner than may be expected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-3C show example block diagrams of a method for determining availability of an engine starting device to start the engine;

DETAILED DESCRIPTION

Figure 1:
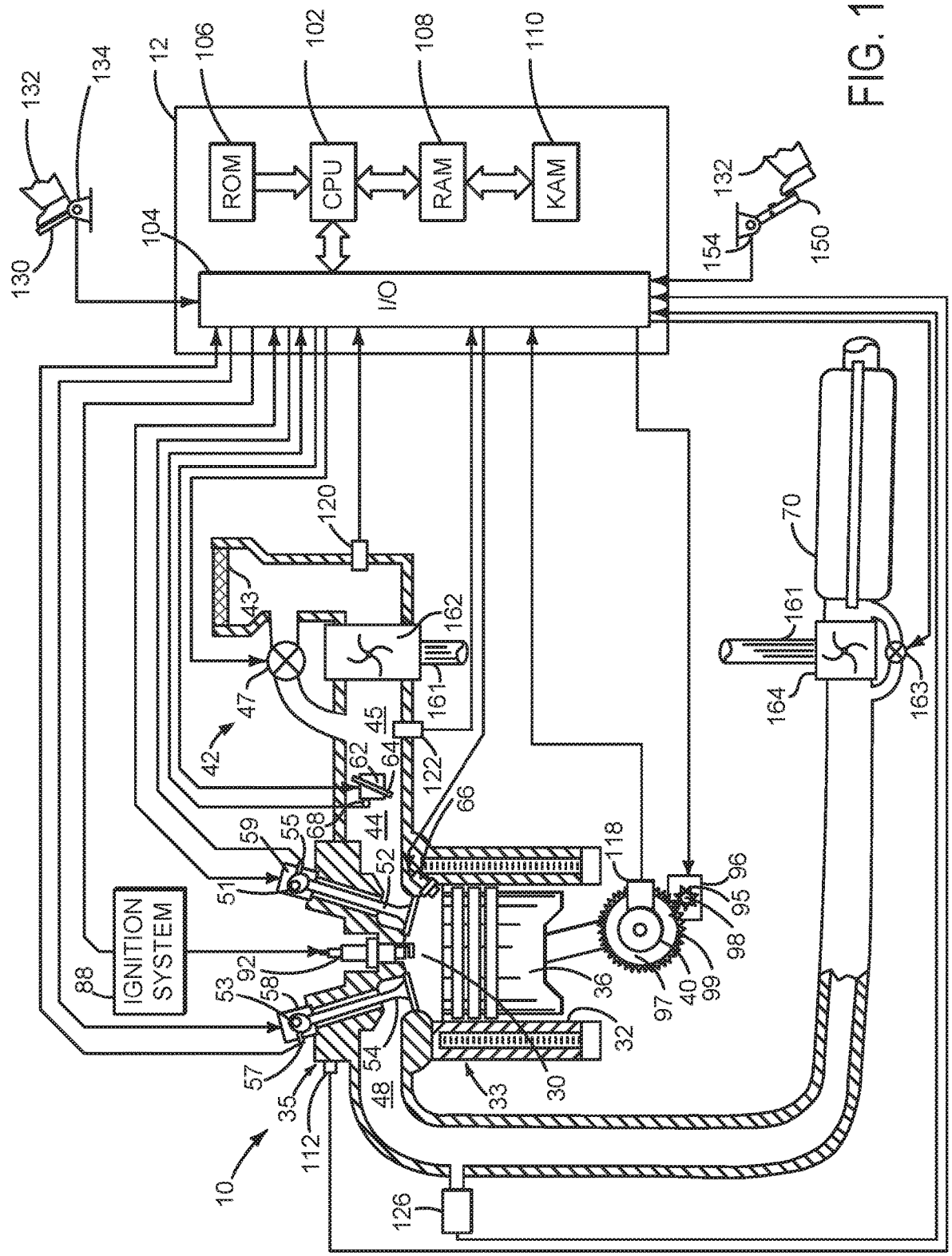
FIG. 1 shows a schematic diagram of an internal combustion engine.

The present description is related to controlling selection of a device to start an engine from a group of engine starting devices. The device selected to start an engine for a particular engine start may be a function of a total number of engine starts generated via each engine starting device, distance traveled by the vehicle since the most recent engine start, distance traveled by the vehicle since the starting device was installed in the vehicle, and an amount of time that the engine has been continuously been running (e.g., rotating and combusting fuel). The engine starting device selection may be applied to an engine of the type shown in FIG. 1. The engine may be included in a driveline as shown in FIG. 2. The driveline may include more than one engine starting device. In one example, a conventional starter and a belt integrated starter/generator (BISG) are included in a driveline for starting an engine. Selection of a device to start an engine may be determined as shown in the block diagram of FIGS. 3A-3C and the flowchart of FIGS. 5 and 6. An example vehicle operating sequence according to the method of FIGS. 3A-3C and FIGS. 5 and 6 is shown in FIG. 4.

An engine of a vehicle that has been pulled-down to zero speed such that the engine's rotational speed is stopped may help to conserve fuel during a vehicle drive cycle. After the engine pull-down, the engine may be restarted by one of a plurality of engine starting devices that may be included with a vehicle in response to vehicle operating conditions. Actions and conditions encountered by the vehicle when a typical human driver operates the vehicle may allow the vehicle's control system to distribute engine starts to engine starting devices in a way that meets predetermined expectations. For example, after an engine pull-down, a typical human driver may gradually apply a propulsion pedal and request torque that is less than a threshold amount. Because the vehicle's drive away is not rapid, the engine may be started via a conventional starter, a BISG, or an ISG while meeting drive away expectations. However, if the human driver often requests more than a threshold amount of torque after an engine pull-down, then engine starting may be performed via only a single starting device (e.g., the ISG) to meet the higher torque demand. Such operation may cause one engine starting device and its associated components (e.g., driveline disconnect clutch, pinion, pinion gear, belt, etc.) to start the engine much more frequently than other starting devices. Consequently, the starting device that is applied to start the engine more frequently may tend to degrade sooner than engine starting devices that may be used to start the engine less frequently. In addition, each of the engine's starting devices may have a different expected lifespan, so if an engine starting device that is expected to have a shorter lifespan is used more frequently, service may need to be performed on the vehicle sooner than may be expected.

The inventors herein have recognized the above-mentioned issues and have developed a method for operating a vehicle, comprising: selecting a preference for a first engine starting device in response to vehicle attributes other than engine starter attributes; selecting a preference for a second engine starting device in response to engine starting device attributes; selecting an engine starting device via a controller in response to the preference for the first engine starting device and the preference for the second engine starting device; and starting an engine via the engine starting device.

By starting an engine via an engine starting device that is selected according to vehicle attributes and engine starter attributes, it may be possible to balance engine starts between a plurality of engine starting devices so that each engine starting device may not degrade more than may be desired during a lifespan of a vehicle. For example, if two engine starting devices have equal expected lifespans, each of the two engine starting devices may be applied to start an engine an equal number of times. However, if a first of the two engine starting devices has a shorter expected lifespan than the second of the two engine starting devices, the second starting device may be selected to start the vehicle more often so that lifespans of both engine starting devices meet expectations.

The present description may provide several advantages. Specifically, the approach may ensure that each of a plurality of engine starters meet an expected lifespan. Further, the approach may adapt which engine starter is applied to start an engine according to starter operation and performance in other similar vehicles so that vehicles of the same type may operate similarly even though they may be driven via different operators. In addition, the approach may reduce warranty cost and improve vehicle owner's satisfaction via extending a lifespan of a particular engine starting device.

The above advantages and other advantages, and features of the present description will be readily apparent from the following Detailed Description when taken alone or in connection with the accompanying drawings.

Figure 2:
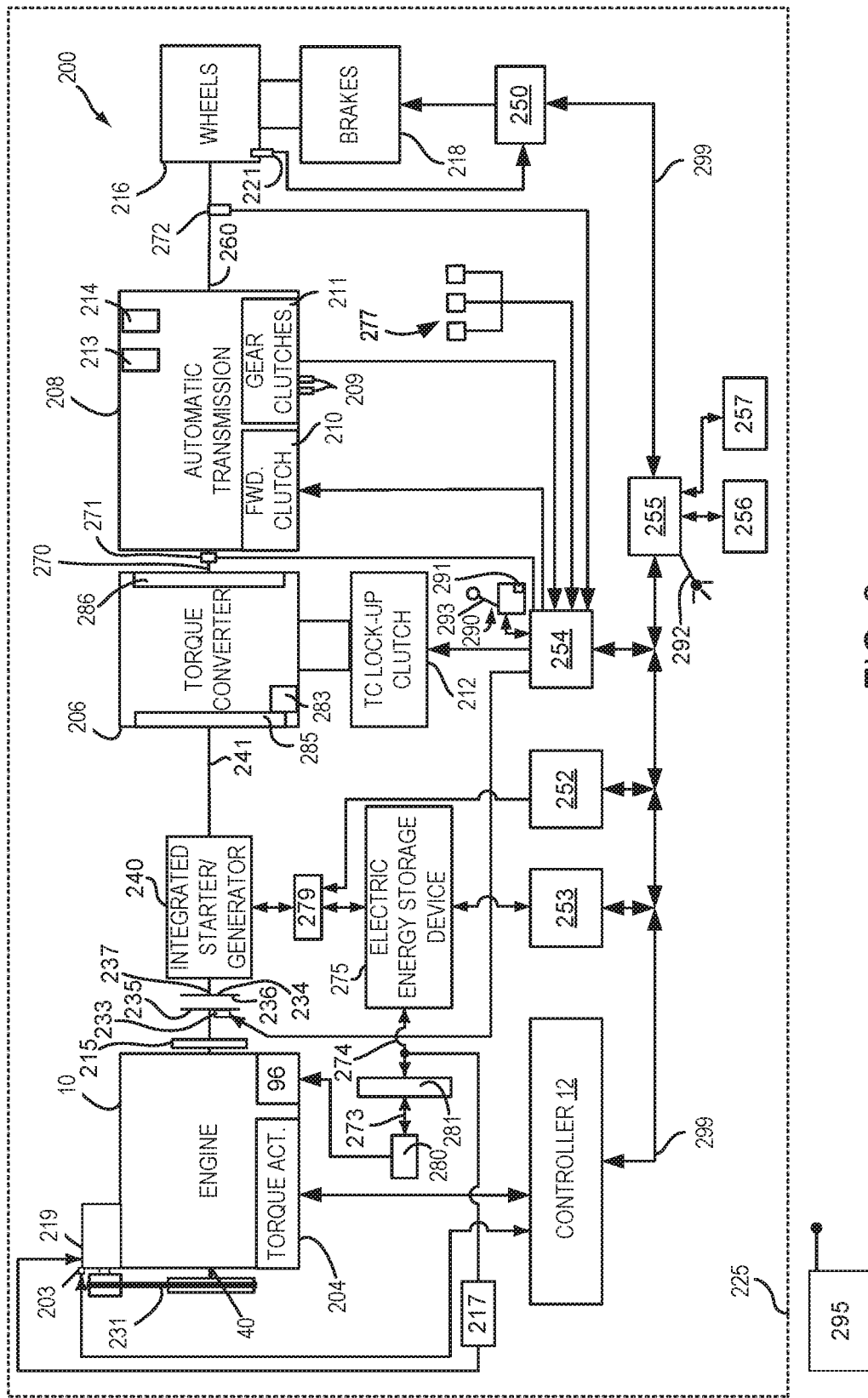
FIG. 2 shows a schematic diagram of an example vehicle driveline or powertrain including the internal combustion engine shown in FIG. 1.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to a propulsion pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a propulsion pedal and vehicle speed, vehicle system controller 255 may request a desired wheel power or a wheel power level to provide a desired rate of vehicle speed change. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

Vehicle system controller 255, or another controller, may send data (e.g., adjustment factors, vehicle data, etc.) and receive data (e.g., control parameters, instructions, software updates, etc.) from external or cloud server (e.g., a computing device including one or more processors, memory, and inputs/outputs) 295 via transceiver 292. Transceiver 292 may transmit and receive data via satellite, cellular network, or other radio frequency device as part of communicating with external server 295.

In this example, powertrain 200 may be powered by engine 10 and electric machine 240 (e.g., ISG). In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via high voltage bus 274 via inverter 217. Inverter 217 converts direct current (DC) power from high voltage bus 274 to alternating current (AC) and vice-versa so that power may be exchanged between BISG 219 and electric energy storage device 275. Thus, BISG 219 may operate as a generator supplying electrical power to high voltage electric energy storage device (e.g., battery) 275 and/or low voltage bus 273. Bi-directional DC/DC converter 281 may transfer electrical energy from a high voltage buss 274 to a low voltage bus 273 or vice-versa. Low voltage battery 280 is electrically directly coupled to low voltage bus 273. Low voltage bus 273 may be comprised of one or more electrical conductors. Electric energy storage device 275 is electrically coupled to high voltage bus 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISO input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISO 240. Alternatively, inverter 279 may convert AC power from ISO 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISO 240 rotates at the same rate as powertrain 200. Electrical energy storage device 275

(e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be transferred to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information.

In response to a request to increase speed of vehicle 225, vehicle system controller may obtain a driver demand power or power request from a propulsion pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISO power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel torque limit of 50 N-m, ISG power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; a plurality of engine starting devices; and a controller including executable instructions stored in non-transitory memory that cause the controller to adjust a starting device selection procedure in response to data received from a server that is external to a vehicle that includes the internal combustion engine. The vehicle system further comprises additional executable instructions stored in non-transitory memory that cause the controller to transmit data to the server. The vehicle system includes where the data includes values of automatic engine stop inhibit adjustment factors. The vehicle system includes where the values of automatic engine stop inhibit adjustment factors are based on starting device durability metrics. The vehicle system includes where the starting device durability metrics include a total number of engine starts performed via a starting device since a time when the starting device was installed in a vehicle. The vehicle system includes where the starting device durability metrics include a total distance traveled by a vehicle since a time when the starting device was installed in the vehicle. The vehicle system further comprises additional executable instructions stored in non-transitory memory that cause the controller to select a preference for a first engine starting device in response to vehicle attributes. The vehicle system further comprises additional executable instructions stored in non-transitory memory that cause the controller to select a preference for a second engine starting device in response to starting device attributes.

Figure 3B:
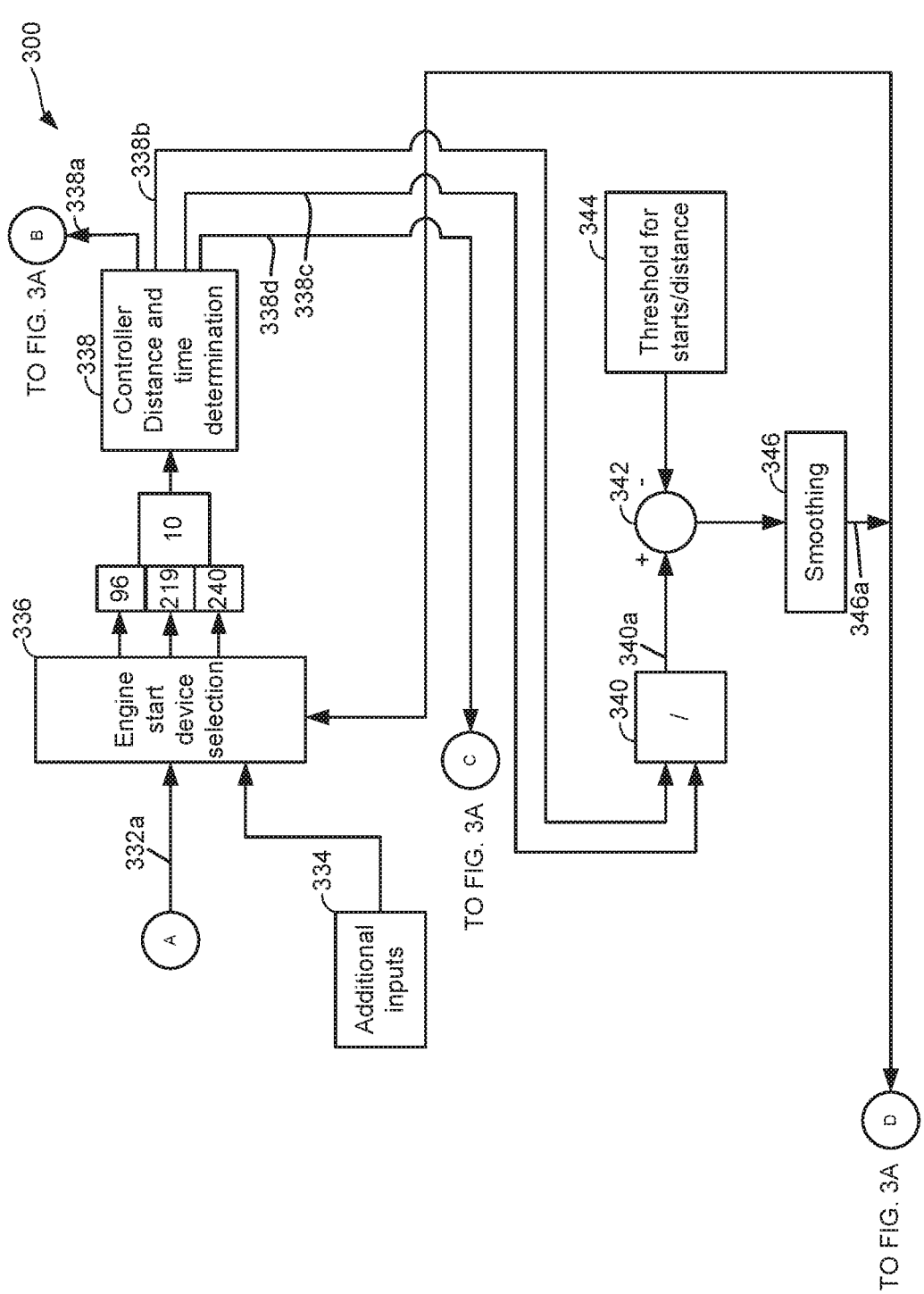
Figure 3C:
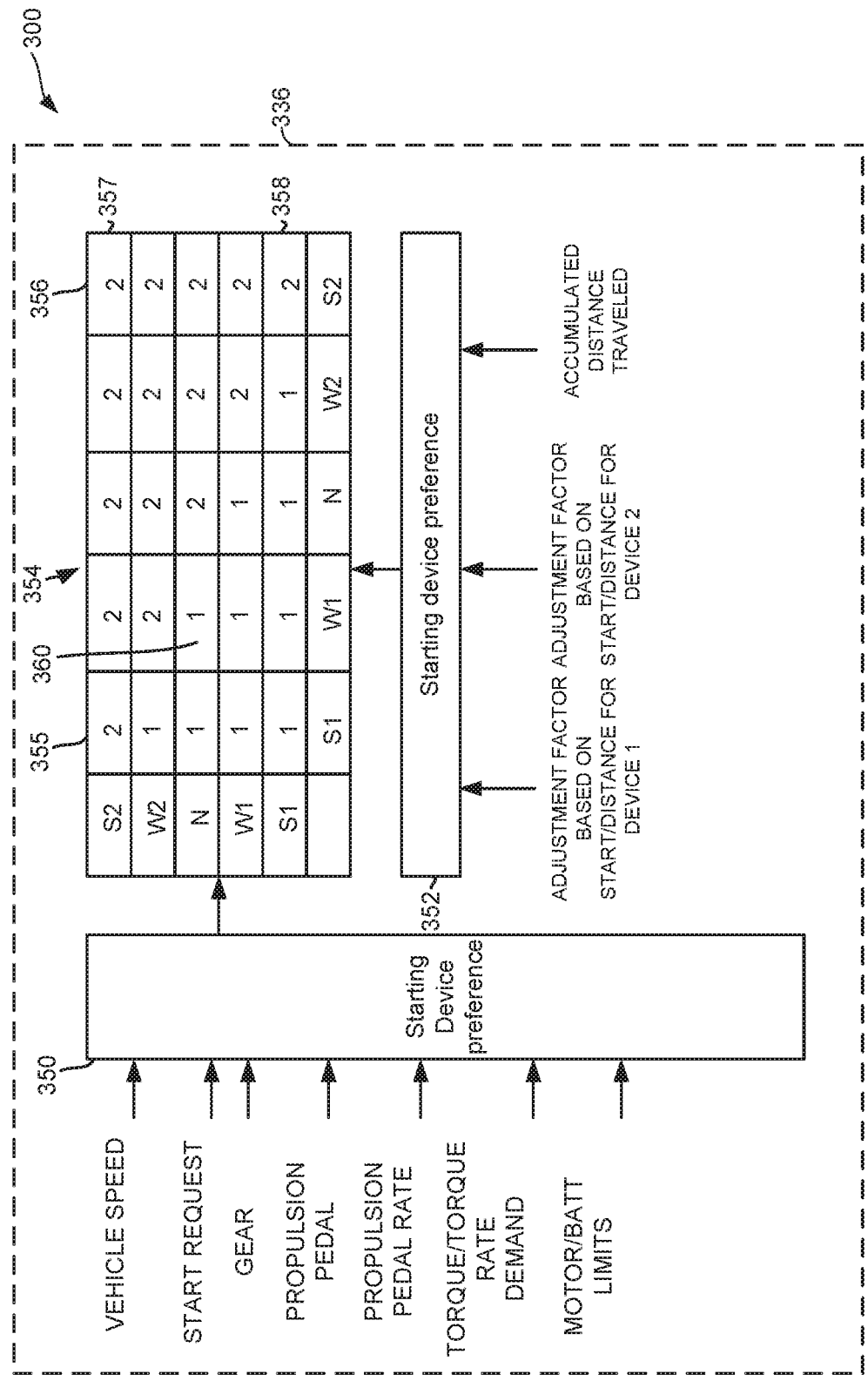
Figure 4:
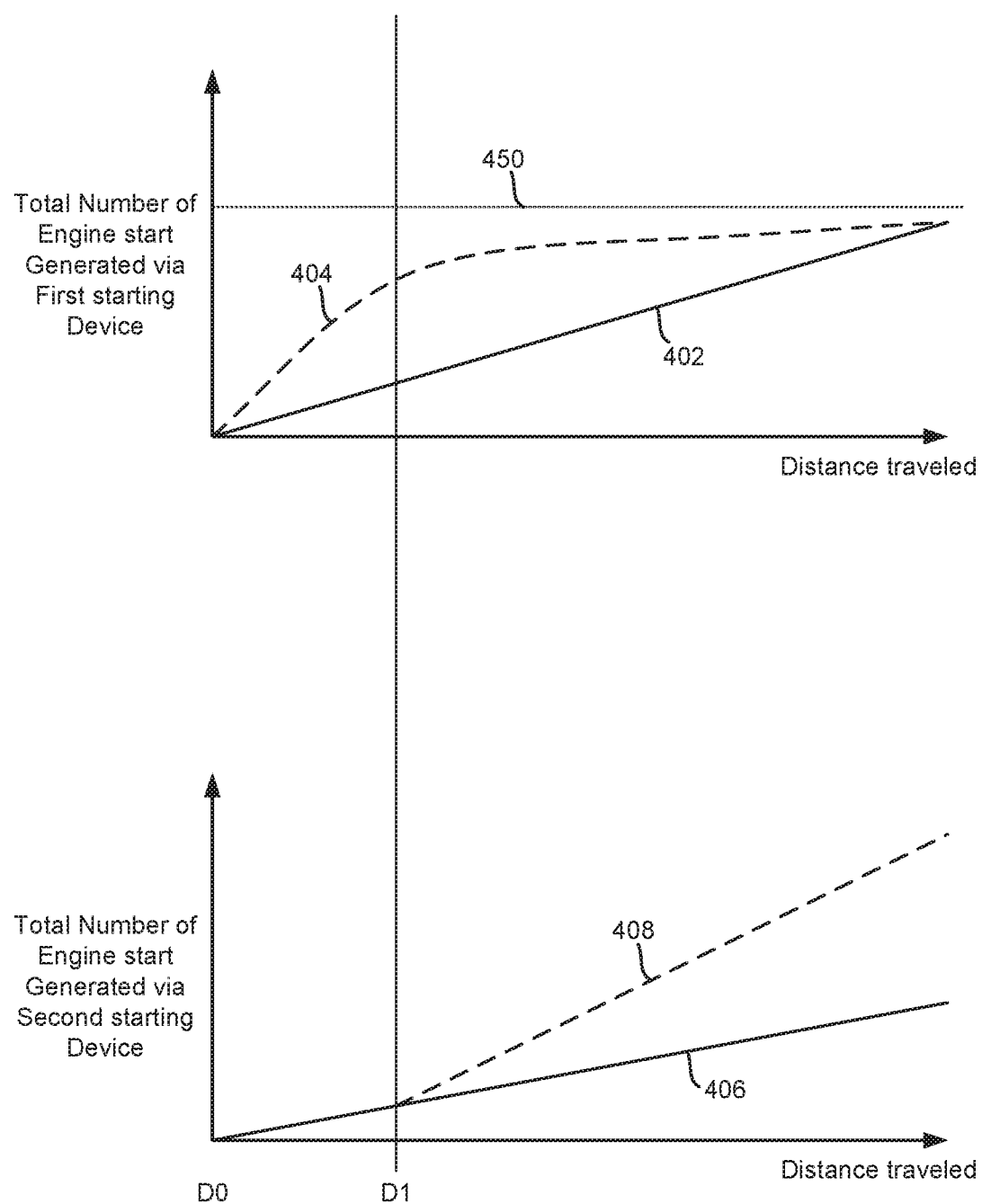
FIG. 4 shows use of two different engine starting devices according to the method of FIGS. 5 and 6.

Referring now to FIGS. 3A-3C, a block diagram 300 of a method to control engine starting and inhibiting of automatic engine stopping (e.g., an engine stop that is requested via a controller without input via a human to a dedicated device that has a sole purpose of starting/stopping an engine, such as a key switch, pushbutton, or display) based, at least in part, on operating conditions of an engine starting device is shown. Since block diagram 300 controls automatic engine stopping, it also controls whether or not an engine may be automatically restarted. For example, if block diagram 300 prevents automatic engine stopping, it prevents automatic engine starting since the engine may not be automatically started without being automatically stopped. The block diagram may be implemented as executable instructions in one or more of the controllers shown in FIGS. 1 and 2. Herein, block diagram 300 is described according to block 300 being based on a starting device that is a BISG. However, the method of block diagram 300 may be applied to a conventional starter (e.g., 96 of FIG. 1) and/or an ISG (e.g., 240 of FIG. 2). In addition, similar block diagrams for describing control of inhibiting automatic engine stopping based on other engine starting devices (e.g., starter and ISG) may be generated. At least portions of block diagram 300 may be implemented as executable controller instructions stored in non-transitory memory. In addition, block diagram 300 may operate in cooperation with the system of FIGS. 1 and 2. Further, at least portions of the method described by block diagram 300 may be actions taken via a controller in the physical world to transform an operating state of an actuator or device.

Block 338 represents the vehicle powertrain control system (e.g., controllers, sensors, and actuators shown in FIG. 2) and the vehicle powertrain control system determines an amount of time since the engine was most recently running (e.g., rotating and combusting fuel) and outputs the amount of time at output 318a. For example, if an engine is started at time t0, the present time is t1, and the amount of time between t0 and time t1 is two minutes, then block 338 outputs a value of two minutes at output 338a, which is input to block 310. Block 338 also outputs an actual total number of engine starts since the engine starting device (BISG) was installed in the vehicle. For example, if the BISG was installed at time of vehicle manufacture and the engine has started a total of 1000 times since the BISG was installed in the vehicle, then block 338 outputs a value of 1000 at output 338b. Thus, the actual total number of engine starts begins with the first engine start generated by the engine starting device immediately following installation of the engine starting device into the vehicle. Block 338 also outputs a total distance that the vehicle (e.g., vehicle 225 of FIG. 2) has traveled since the engine starting device (BISG) was installed in the vehicle. For example, if the BISG was installed at time of vehicle manufacture and the vehicle has traveled an actual total of 10,000 kilometers since the BISG was installed in the vehicle, then block 338 outputs a value of 10,000 kilometers at output 338c. Block 338 also outputs a distance traveled by the vehicle since the engine was most recently started and began running continuously (e.g., without stopping). For example, if the engine started running most recently with a total distance traveled since vehicle manufacture of 20,000 kilometers and the vehicle's present distance traveled is 20,100 kilometers with no engine stopping (e.g., no stopping of engine rotation) between the 20,000 kilometers and the 20,100 kilometers, then block 338 outputs a value of 100 kilometers at output 338d.

Block 340 receives the output of 338*b* and 338*c* and it outputs a cumulative actual total number of engine starts per unit distance traveled by the vehicle since the engine starting device (BISG) was installed in the vehicle at output 340*a*. Block 340 arrives at the cumulative actual total number of engine starts per unit distance by dividing the actual total number of engine starts since the engine starting device (BISG) was installed in the vehicle by the total distance that the vehicle has traveled since the engine starting device (BISG) was installed in the vehicle. The output 340*a* is input to summing junction 342.

At summing junction 342, a predetermined threshold actual total number of engine starts per unit distance traveled by the vehicle since the engine starting device was installed in the vehicle from block 344 is subtracted from the cumulative actual total number of engine starts per unit distance traveled by the vehicle since the engine starting device (BISG) was installed in the vehicle. Summing junction 342 outputs an error of the cumulative actual total number of engine starts per unit distance traveled by the vehicle since the engine starting device (BISG) was installed in the vehicle to block 346. The predetermined threshold actual total number of engine starts per unit distance traveled by the vehicle since the engine starting device was installed in the vehicle may be based on a desired level of durability for the engine starting device (BISG).

Block 346 smooths the output of summing junction 342. In one example, block 346 may integrate the output of summing junction 342. In another example, block 346 may low pass filter output of summing junction 342 via a first order low pass filter. In still another example, block 346 may rate limit output of summing junction 342. For example, block 346 may only allow a maximum rate of change of 0.5 engine starts per kilometer traveled. Block 346 outputs a smoothed output of summing junction 342 at output 346*a* to blocks 304, 308, 312, 316, 320, 324, and 328.

At block 302, block diagram 300 outputs other requests for engine pull-ups (e.g., engine starts) and engine pull-downs. For example, an automatic engine pull-down request may be generated when a vehicle is not moving for a threshold amount of time and the vehicle's brake pedal is applied. Further, an engine pull-down request may be generated when a human vehicle operator specifically requests an engine stop via a dedicated input that has a sole function of requesting engine stops and starts (e.g., a pushbutton, key switch, or display panel). An engine pull-up or engine start request may be generated via block 302 in response to a propulsion pedal being applied, a battery state of charge (SOC) less than a threshold, a temperature of an emissions device, or other vehicle operating condition. Block 302 outputs other engine pull-up and pull-down requests at output 302*a* to block 332.

At block 304, block diagram 300 determines a minimum vehicle travel distance for continuous engine operation or running for enabling automatic engine pull-down. For example, block 304 may output a value of 10 kilometers when the smoothed error output of block 346 is a value of 0.5 engine starts/kilometer distance traveled by the vehicle. In one example, block diagram 300 indexes or references a table or function that outputs a minimum vehicle travel distance with continuous engine operation for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of distance traveled by the vehicle.

Thus, block 304 outputs an amount of distance at output 304*a*. In one example, if the cumulative engine starts per unit distance traveled error has a positive sign, the output of block 304 increases the minimum distance that the vehicle travels with continuous engine operation before automatic engine pull-down is permitted. Conversely, if the cumulative engine starts per unit distance traveled error has a negative sign, the output of block 304 decreases the minimum distance that the vehicle travels with continuous engine operation (e.g., rotating and combusting fuel) before automatic engine pull-down is permitted.

At block 306, block diagram 300 determines if the distance output by block 304 is greater than the distance output by block 338. In other words, block 306 judges if the minimum distance that the vehicle traveled before engine pull-down is permitted is greater than the distance the vehicle has traveled since the most recent engine start. If block 306 judges that the minimum distance of vehicle travel before engine pull-down is permitted is greater than the distance the vehicle has traveled since the most recent engine start the time, then the answer is true and block 306 outputs a logical TRUE value at output 306*a* to block 332. If block 306 judges that the distance that is output by block 304 is not greater than the output 338*d*, then the answer is FALSE and block 306 outputs a logical FALSE value at output 306*a* to block 332.

At block 308, block diagram 300 determines a minimum amount of time of continuous engine operation (e.g., rotating and combusting fuel) or engine running time for enabling automatic engine pull-down. For example, block 308 may output a value of 10 minutes when the smoothed error output of block 346 is a value of 0.5 engine starts/kilometer distance traveled by the vehicle. In one example, block diagram 300 indexes or references a table or function that outputs a minimum amount of time of continuous engine operation for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of continuous engine operation. Thus, block 308 outputs an amount of time at output 308*a* to block 310. In one example, if the cumulative engine starts per unit distance traveled error (346*a*) has a positive sign, the output of block 308 increases the minimum amount of time of continuous engine operation before automatic engine pull-down is permitted via calibratable function of the error (346*a*). Conversely, if the cumulative engine starts per unit distance traveled error (346*a*) has a negative sign, the output of block 308 decreases the minimum amount of time of continuous engine operation (e.g., rotating and combusting fuel) in a calibratable (e.g., adjustable via functions stored in controller memory) manner before automatic engine pull-down is permitted.

At block 310, block diagram 300 determines if the time output by block 308 is greater than the time output by block 338. In other words, block 310 judges if the minimum time of continuous engine running is greater than the amount of time the engine has continuously been running since the most recent engine start. If block 310 judges that the time that is output by block 308 is greater than the output 338*a*, then the answer is true and block 310 outputs a logical TRUE value at output 310*a* to block 332. If block 310 judges that the time that is output by block 308 is not greater than the output 338*a*, then the answer is FALSE and block 310 outputs a logical FALSE value at output 310*a* to block 332.

At block 312, block diagram 300 determines a minimum driver demand torque (e.g., a wheel torque) to enable automatic engine pull-down. For example, block 312 may output a value of 100 Newton-meters when the smoothed error output of block 346 is a value of 0.5 engine starts/ kilometer distance traveled by the vehicle. In one example, block diagram 300 indexes or references a table or function that outputs a minimum driver demand torque for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of minimum driver demand torque. Thus, block 312 outputs a minimum driver demand torque at output 312a. In one example, if the cumulative engine starts per unit distance traveled error has a positive sign, the output of block 312 decreases the minimum driver demand torque at which automatic engine pull-down is permitted. Conversely, if the cumulative engine starts per unit distance traveled error has a negative sign, the output of block 312 increases the minimum driver demand torque at which automatic engine pull-down is permitted.

At block 314, block diagram 300 determines if the minimum driver demand torque output by block 312 is less than the driver demand torque (DT). In other words, block 314 judges if the minimum driver demand torque at which engine pull-down is permitted is less than the present driver demand torque. If block 314 judges that the minimum driver demand torque is less than the present driver demand torque, the answer is TRUE and block 314 outputs a logical TRUE value at output 314a to block 332. If block 314 judges that the minimum driver demand torque is not less than the present driver demand torque, the answer is FALSE and block 314 outputs a logical FALSE value at output 314a to block 332. It should be noted that hysteresis may be incorporated into this comparison so that jitter or rapid state changing of the output may be avoided.

At block 316, block diagram 300 determines a minimum driver demand power (e.g., a wheel power) to enable automatic engine pull-down. For example, block 316 may output a value of 1000 Kilowatts when the smoothed error output of block 346 is a value of 0.5 engine starts/kilometer distance traveled by the vehicle. In one example, block diagram 300 indexes or references a table or function that outputs a minimum driver demand power for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of minimum driver demand power. Thus, block 316 outputs a minimum driver demand power at output 316a. In one example, if the cumulative engine starts per unit distance traveled error has a positive sign, the output of block 316 decreases the minimum driver demand power at which automatic engine pull-down is permitted. Conversely, if the cumulative engine starts per unit distance traveled error has a negative sign, the output of block 316 increases the minimum driver demand power at which automatic engine pull-down is permitted.

At block 318, block diagram 300 determines if the minimum driver demand power output by block 316 is less than the driver demand power (DP). In other words, block 318 judges if the minimum driver demand power at which engine pull-down is permitted is less than the present driver demand power. If block 318 judges that the minimum driver demand power is less than the present driver demand power, the answer is TRUE and block 318 outputs a logical TRUE value at output 318a to block 332. If block 318 judges that the minimum driver demand torque is not less than the present driver demand torque, the answer is FALSE and block 318 outputs a logical FALSE value at output 318a to block 332. It should be noted that hysteresis may be incorporated into this comparison so that jitter or rapid state changing of the output may be avoided.

At block 320, block diagram 300 determines a minimum battery state of charge (SOC) to enable automatic engine pull-down. For example, block 320 may output a value of 75% when the smoothed error output of block 346 is a value of 0.5 engine starts/kilometer distance traveled by the vehicle. In one example, block diagram 300 indexes or references a table or function that outputs a minimum SOC for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of SOC at which automatic engine stop is permitted. Thus, block 320 outputs a SOC at output 320a. In one example, if the cumulative engine starts per unit distance traveled error has a positive sign, the output of block 320 increases the SOC at which automatic engine pull-down is permitted. Conversely, if the cumulative engine starts per unit distance traveled error has a negative sign, the output of block 320 decreases the SOC at which automatic engine pull-down is permitted.

At block 322, block diagram 300 determines if the minimum SOC output by block 320 is less than the present SOC. In other words, block 322 judges if the minimum SOC at which engine pull-down is permitted is greater than the present SOC. If block 322 judges that the minimum SOC is greater than the present SOC, the answer is TRUE and block 322 outputs a logical TRUE value at output 322a to block 332. If block 322 judges that the minimum SOC is not less than the present SOC, the answer is FALSE and block 322 outputs a logical FALSE value at output 314a to block 332. It should be noted that hysteresis may be incorporated into this comparison so that jitter or rapid state changing of the output may be avoided.

At block 324, block diagram 300 determines a maximum vehicle speed to enable automatic engine pull-down. For example, block 312 may output a value of 100 kilometers/ hour. In one example, block diagram 300 indexes or references a table or function that outputs a maximum vehicle speed to enable automatic engine pull-down via the smoothed output of block 346 (e.g., smoothed error of cumulative engine starts per unit distance traveled). The values in the memory location may be empirically determined via operating a vehicle and assessing a level of engine starting device degradation as a function of maximum vehicle speed. Thus, block 324 outputs a maximum vehicle speed.

At block 326, block diagram 300 determines if the maximum vehicle speed output by block 324 is less than the present vehicle speed (VS). In other words, block 326 judges if the maximum vehicle speed at which engine pull-down is permitted is less than the present vehicle speed. If block 326 judges that the maximum vehicle speed is less than the present vehicle speed, the answer is TRUE and block 326 outputs a logical TRUE value at output 326a to block 332. If block 326 judges that the maximum vehicle speed is not less than the present vehicle speed, the answer is FALSE and block 326 outputs a logical FALSE value at output 326a to block 332. It should be noted that hysteresis may be incorporated into this comparison so that jitter or rapid state changing of the output may be avoided.

At block 328, block diagram 300 determines a maximum transmission assembly input speed (e.g., input shaft speed) to enable automatic engine pull-down. For example, block 328 may output a value of 3000 RPM. In one example, block diagram 300 indexes or references a table or function that outputs a maximum transmission assembly input speed for enabling automatic engine pull-down via the smoothed output of block 346 (e.g., smoothed error of cumulative engine starts per unit distance traveled). The values in the memory location may be empirically determined via operating a vehicle and assessing a level of engine starting device degradation as a function of maximum vehicle speed. Thus, block 328 outputs a maximum transmission input shaft speed.

At block 330, block diagram 300 determines if the maximum transmission input shaft speed output by block 328 is less than the present transmission input shaft speed (TrnAin). In other words, block 330 judges if the maximum transmission input shaft speed at which engine pull-down is permitted is less than the present transmission input shaft speed. If block 330 judges that the maximum transmission input shaft speed is less than the transmission input shaft speed, the answer is TRUE and block 330 outputs a logical TRUE value at output 330*a* to block 332. If block 330 judges that the maximum transmission input shaft speed is not less than the present transmission input shaft speed, the answer is FALSE and block 330 outputs a logical FALSE value at output 330*a* to block 332. It should be noted that hysteresis may be incorporated into this comparison so that jitter or rapid state changing of the output may be avoided.

At block 332, block diagram 300 applies engine stop/start or pull-down/pull-up logic to determine whether the desired engine state is on (e.g., rotating and combusting fuel) or off (e.g., not rotating and not combusting fuel). In one example, block 312 determines the desired engine state according to input from block 302, block 306, block 310, block 314, block 318, block 322, block 326, and block 330. In one example, if any of the pull-down inhibit signals is logically TRUE, the engine pull-down is inhibited. For example, if block 302 outputs an engine pull-down request that is based on vehicle speed being zero while the vehicle's brake pedal is applied and one of blocks 306 and 310 outputs a logical TRUE value, then engine pull-down is inhibited. However, if block 302 outputs an engine pull-down request that is based on vehicle speed being zero while the vehicle's brake pedal is applied and blocks 306 and 310 output logical FALSE values, then engine pull-down is not inhibited. Block 332 outputs the requested engine state at output 332*a*.

At block 336, block diagram 300 determines which engine starting device is to be applied to start the engine if the desired engine state is "on." Block 336 judges which engine starting device is to be applied to start the engine based on inputs from block 334. Block 334 provides vehicle operating conditions to block 336. For example, block 334 may output engine oil temperature, ambient temperature, and engine cylinder head temperature to block 336. Block 336 may select starter 96 of FIG. 1 to start the engine when these three temperatures are each below 5° C. On the other hand, block 336 may select BISG 219 to start the engine when engine oil temperature and cylinder head temperature are greater than 20° C. Further, block 336 may select ISG 240 to start the engine when BISG 219 is degraded. Block 336 commands one of engine starting device 96, 219, or 240 to start the engine when an engine start is requested. The engine starting device 96, 218, or 240 that has been commanded to start the engine rotates the engine at a predetermined cranking speed (e.g., 240 RPM). The engine may be started via supplying spark and fuel to the engine's cylinders. Engine operating conditions are provided to the engine control system 318 via the sensors and actuators described herein.

One example of how block 336 selects an engine starting device from a plurality of engine starting devices is shown in FIG. 3C. In this example, block 336 includes instructions and logic for determining a starting device preference selection that is based on vehicle operating conditions (e.g., vehicle speed, engine start request, presently engaged transmission gear, propulsion pedal position, propulsion pedal rate of change, driver demand torque and/or rate of torque change, and electric machine and battery limits (e.g., current limits, temperature limits, etc.)) as indicated by sub-block 350. The vehicle operating conditions may be indicative of noise, vibration, harshness (NVH), vehicle drivability, and efficiency). In particular, sub-block 350 may include fuzzy logic that generates a value and an engine starting device preference may be selected from the value. For example, a strong preference for a conventional starter to start the engine may be selected when an internal value within sub-block 350 is between 0 and 1.5. A weak preference for the conventional starter to start the engine may be selected when the internal value within sub-block 350 is between 1.5 and 3.0. A strong preference for the BISG to start the engine may be selected when the internal value within sub-block 350 is greater than 3.0 and less than 4.5. A weak preference for the BISG to start the engine may be selected when the internal value within sub-block 350 is greater than 4.5 and less than 6.0. A strong preference for the ISG to start the engine may be selected when the internal value within sub-block 350 is greater than 6.0 and less than 7.5. A weak preference for the ISG to start the engine may be selected when the internal value within sub-block 350 is greater than 7.5 and less than 9.0. The states of the various vehicle operating conditions are the basis for generating the internal value within sub-block 350. Thus, if the internal value generated within sub-block 350 is a value of 1.0, a strong preference for starting the engine via the conventional starter may be selected. The engine starting device operating conditions may be used to reference or index tables and/or functions that output values that may be summed to determine the internal value that the starting device selection preference is based on. Sub-block 352 outputs an engine starting device preference according to the internal value to reference rows of table 354.

In this example, block 336 also includes instructions and logic for determining a starting device preference selection that is based on engine starting device conditions (e.g., a total number of engine starts initiated by the engine starting device, etc.) as indicated by sub-block 352. In particular, sub-block 352 may include fuzzy logic that generates a value and an engine starting device preference is selected from the value. For example, a strong preference for a conventional starter to start the engine may be selected when an internal value within sub-block 352 is between 0 and 1.5. A weak preference for the conventional starter to start the engine may be selected when the internal value within sub-block 352 is between 1.5 and 3.0. A strong preference for the BISG to start the engine may be selected when the internal value within sub-block 352 is greater than 3.0 and less than 4.5. A weak preference for the BISG to start the engine may be selected when the internal value within sub-block 352 is greater than 4.5 and less than 6.0. A strong preference for the ISG to start the engine may be selected when the internal value within sub-block 352 is greater than 6.0 and less than 7.5. A weak preference for the ISG to start the engine may be selected when the internal value within sub-block 352 is greater than 7.5 and less than 9.0. In one example, engine starting device conditions include an actual total number of engine starts since a conventional starter was installed in the vehicle divided by a total distance traveled by the vehicle since the conventional starter was installed in the vehicle, an actual total number of engine starts since a BISG was installed in the vehicle divided by a total distance traveled by the vehicle since the BISG was installed in the vehicle, an actual total number of engine starts since a ISO was installed in the vehicle divided by a total distance traveled by the vehicle since the ISO was installed in the vehicle, and an accumulated distance that the vehicle has traveled since the vehicle was manufactured. The states of the various engine starting devices are the basis for generating the internal value within sub-block 352. Thus, if the internal value generated within sub-block 352 is a value of 8.0, a weak preference for starting the engine via the ISO may be selected. The engine starting device operating conditions may be used to reference or index tables and/or functions that output values that may be summed to determine the internal value that the starting device selection preference is based on. Sub-block 352 outputs an engine starting device preference according to the internal value to reference columns of table 354.

In this example, table 354 includes five working rows and five working columns. However, table 354 may include additional rows, columns, and dimensions (e.g., three dimensions for systems that include three engine starting devices) in other examples. The first working column is indicated at 355 and the fifth working column is indicated at 356. The first working row is indicated at 357 and the fifth working row is indicated at 358. Each of the columns and each of the rows may be referenced via enumerated engine starting device preferences as indicated by S2, W2, S1, W1, and N. In this example, row one may be referenced when the preferred engine starting device output from block 350 is S2. On the other hand, column five may be referenced when block 352 outputs S2. Each working cell (e.g., cells that may be referenced to output a value or data) of table 354 includes a number. The number corresponds to a particular engine starting device that is selected to start the engine. For example, the value 1 corresponds to a conventional starter and the value 2 corresponds to the BISG. Thus, if block 350 outputs N and block 352 outputs W1, then table 354 outputs a value of 1 from cell 360 and the conventional starter is commanded to start the engine.

Rows of table 354 may be referenced or indexed via enumerated values that are output from blocks 350. In particular, block 350 may output an enumerated value of S1 for strong preference for starting device number one (e.g., conventional starter), an enumerated value of W1 for weak preference for starting device number one, an enumerated value of S2 for strong preference for starting device number two (e.g., BISG), an enumerated value of W2 for weak preference for starting device number two, and an enumerated value of N for no engine starting device preference. These enumerated values are the basis for referencing or indexing values in rows of table 354. For example, if block 350 outputs an enumerated value of S2, then the first row of table 354 is referenced via the output of block 350. The enumerated values described herein are for example only and they are not intended to be an exhaustive list of potential engine starting device enumerations.

Similarly, columns of table 354 may be referenced or indexed via enumerated values that are output from block 352 so that the engine starting device may be selected based on engine starting device durability. In particular, block 352 may output an enumerated value of S1 for strong preference for starting device number one (e.g., conventional starter), an enumerated value of W1 for weak preference for starting device number one, an enumerated value of S2 for strong preference for starting device number two (e.g., BISG), an enumerated value of W2 for weak preference for starting device number two, and an enumerated value of N for no engine starting device preference. These enumerated values are the basis for referencing or indexing column values in table 354. For example, if block 350 outputs an enumerated value of S2, then the fifth column of table 354 may be referenced via the output of block 350. The first engine starting device may be preferred over the second engine starting device when the actual total number of engine starts initiated by the second engine starting device divided by the distance traveled by the vehicle is greater than the actual total number of engine starts initiated by the first engine starting device divided by the distance traveled by the vehicle.

In this way, an engine starting device may be selected from a plurality of engine starting devices based on or according to engine starting device preference for NVH, drivability, and efficiency. Further, the engine starting device may be selected from a plurality of engine starting devices based on or according to engine starting device durability.

Referring now to FIG. 4, example vehicle operation according to the present description is shown. The operation shown in FIG. 4 may be generated via the system of FIGS. 1 and 2 in cooperation with the method described by the block diagram of FIGS. 3A-3C. Vertical lines at distances D0 and D1 represent times of interest during the operation.

The first plot from the top of FIG. 4 is a plot of the actual total number of engine starts that have been initiated by a first engine starting device (e.g., a conventional starter 96) versus an actual total distance traveled by the vehicle since a first engine starting device was installed in the vehicle. The vertical axis represents the actual total number of engine starts that have been initiated by a first engine starting device. The horizontal axis represents the actual total distance traveled by the vehicle since a first engine starting device was installed in the vehicle. Trace 402 represents the relationship between the actual total number of engine starts that have been initiated by a first engine starting device versus an actual total distance traveled by the vehicle since a first engine starting device was installed in the vehicle for the present system and method when the present system is operated via a typical vehicle human driver. Trace 404 represents the relationship between the actual total number of engine starts that have been initiated by a first engine starting device versus an actual total distance traveled by the vehicle since a first engine starting device was installed in the vehicle for the present system and method when the present system is operated via an atypical vehicle human driver. Trace 450 represents a limit or threshold above which degradation of the first engine starting device may occur.

The second plot from the top of FIG. 4 is a plot of the actual total number of engine starts that have been initiated by a second engine starting device (e.g., a BISG) versus an actual total distance traveled by the vehicle since a second engine starting device was installed in the vehicle. The vertical axis represents the actual total number of engine starts that have been initiated by a second engine starting device. The horizontal axis represents the actual total distance traveled by the vehicle since a second engine starting device was installed in the vehicle. Trace 406 represents the relationship between the actual total number of engine starts that have been initiated by the second engine starting device versus an actual total distance traveled by the vehicle since the second engine starting device was installed in the vehicle for the present method and system when the present system is operated via typical vehicle human driver. Trace 408 represents the relationship between the actual total number of engine starts that have been initiated by a second engine starting device versus an actual total distance traveled by the vehicle since a second engine starting device was installed in the vehicle for the present method and system when the present system is operated via an atypical vehicle human driver.

In this example, if a vehicle including the present system and method is driven via the typical driver, the actual total number of engine starts generated via the first engine starting device increases at a gradual rate per distance traveled by the vehicle as indicated by line 402. Similarly, if the vehicle is driven via the typical driver, the actual total number of engine starts generated via the second engine starting device increases at a gradual rate per distance traveled by the vehicle as indicated by line 406. However, if the vehicle is driven via the atypical driver, the actual total number of engine starts generated via the first engine starting device may increase at a higher rate per distance traveled by the vehicle as indicated by line 404 between D0 and D1 as compared to line 402. If the usage of the first engine starting device were to continue at the rate that it increases between distance D0 and D1 after distance D1, then the first engine starting device may reach and exceed threshold 450. However, the present system and method may intervene such that the rate of actual total number of engine starts initiated by the second engine starting device is increased after distance D1 as indicated by line 406. Correspondingly, the rate of actual total number of engine starts initiated by the first engine starting device is decreased after distance D1 for the atypical driver as indicated by the trajectory of line 404 after D1.

Figure 5:
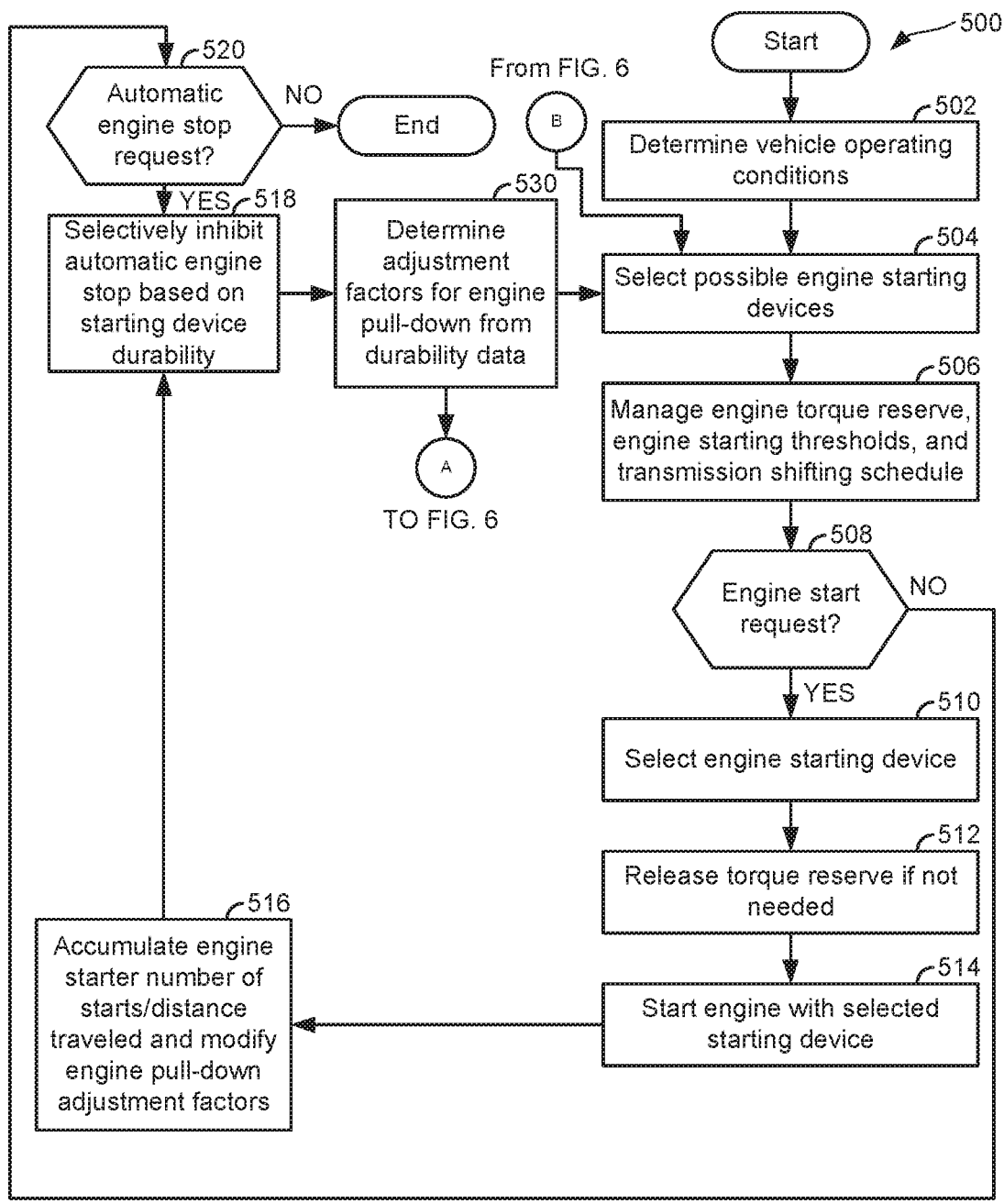
FIGS. 5 and 6 show an example method for starting an engine in a way that distributes engine starts to a plurality of engine starting devices so that starting device lifespans may be distributed among a plurality of engine starting devices in a desired way.
Figure 6:
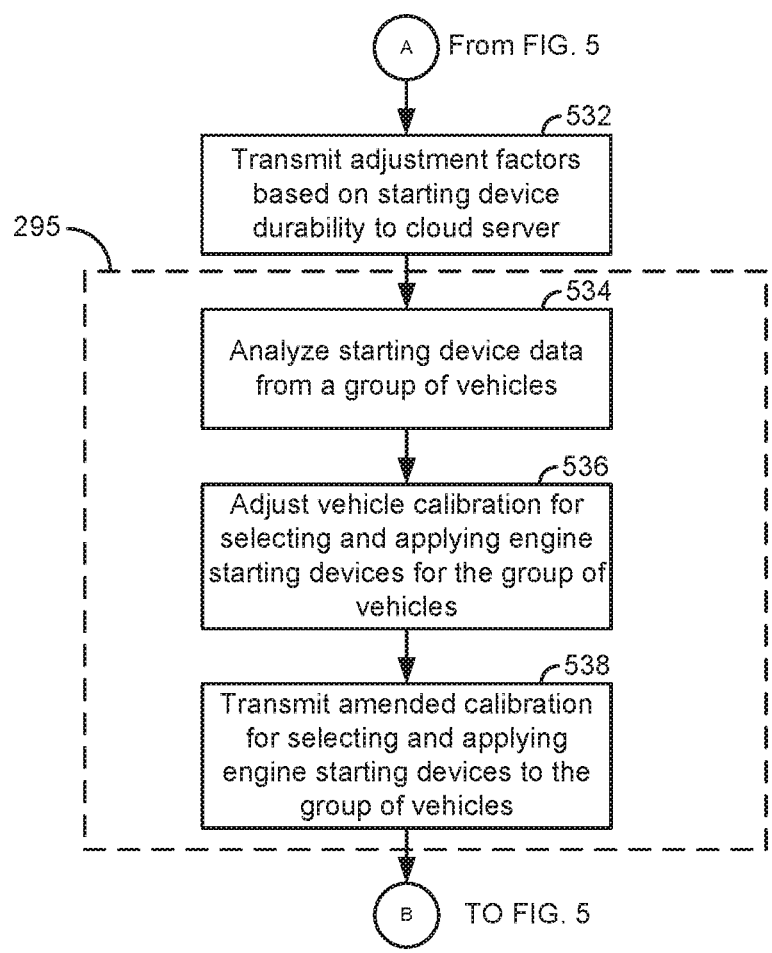

Thus, if a vehicle's driver operates the vehicle in an atypical way, a rate of actual total number of engine starts initiated by one engine starting device may be decreased while a rate of actual total number of engine starts initiated by a different engine starting device may be increased. In this way, operation of engine starting devices may be balanced out over a vehicle's lifespan so that each engine starting device may operate for a predetermined portion of a vehicle's lifespan. Referring now to FIGS. 5 and 6, an example method for operating a vehicle that includes a plurality of engine starting devices is shown. The method of FIGS. 5 and 6 may be incorporated into and may cooperate with the system of FIGS. 1 and 2. In addition, the method of FIGS. 5 and 6 may cooperate with the method described in the block diagrams of FIGS. 3A-3C. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to ambient temperature, engine temperature, transmission temperature, engine starting device temperature, driver demand torque, propulsion pedal position, presently engaged transmission gear, vehicle speed, electric energy storage device state of charge (SOC), electric energy storage device charging and discharging limits, and engine starting device electrical current limits. The various vehicle operating conditions may be determined via the sensors and controllers described herein. Method 500 proceeds to 504.

At 504, method 500 selects possible engine starting devices (e.g., conventional starter, BISG, ISG, etc.). Method 500 may select possible engine starting devices based on whether or not the engine starting devices are available and according to input from a cloud server. For example, if method 500 determines that an engine starting device is not in a degraded state and if an external server has not issued a request to prevent the engine starting device from starting the engine, then method 500 may include the engine starting device in a group of possible engine starting devices. In addition, method 500 may evaluate whether a particular engine starting device is available for starting the engine based on adjustment factors for engine pull-down that are based on engine starting device durability data (e.g., accumulated number starts initiated by a particular engine starting device divided by the total distance that the vehicle has travelled since the starting device was installed). However, if method 500 determines that the engine starting device is in a degraded state or if an external server has issued a request to prevent the engine starting device from starting the engine, then method 500 may not include the engine starting device in the group of possible engine starting devices. Each engine starting device may be evaluated for entry into the group of possible engine starting devices. Method 500 proceeds to 506.

At 506, method 500 manages the driveline's torque reserve, engine starting thresholds, and transmission shifting schedule. In particular, the driveline's torque reserve (e.g., an amount of torque of the driveline that is reserved or set aside for starting an engine), engine starting thresholds, and transmission shifting schedule (e.g., vehicle speeds and engine loads at which the transmission shifts gears) may be adjusted according to which engine starting devices are included in the group of possible engine starting devices. For example, if the ISG (through the KO clutch (236)) and BISG are in the group of possible engine starting devices, then the driveline's torque reserve may be a smaller amount of torque as compared to if only the BISG is in the possible engine starting device group. Likewise, the engine starting thresholds and transmission shifting schedules may be adjusted according to the engine starting devices that are included in the possible engine starting device group. Method 500 proceeds to 508.

At 508, method 500 judges if an engine pull-up or start is requested. The engine start request may be manually generated or automatically generated. An automatic engine start request may be generated via a controller responding to vehicle operating conditions (e.g., SOC, driver demand torque, etc.). A manually engine start may be generated via input to a key switch, push button, or other human/machine interface. If method 500 judges that an engine start is requested, the answer is yes and method 500 proceeds to 510. Otherwise, the answer is no and method 500 proceeds to 520.

At 510, method 500 selects an engine starting device to start the engine. In one example, the engine starting device may be selected as described at 336 of FIG. 3B. Method 500 proceeds to 512.

At 512, method 500 releases driveline torque reserve if it is not needed to start the engine. For example, if the conventional starter is selected to start the engine after having reserved torque to support an ISG/KO start, the driveline torque reserve that may be part of ISG torque capacity may be reduced to zero so that the total torque capacity of the ISG may be delivered to the driveline to propel the vehicle. Method 500 proceeds to 514.

At 514, method 500 starts the engine via the selected engine starting device. Thus, if the conventional starter is selected to start the engine, the engine is rotated via the conventional starter. If the ISG is selected to start the engine, the driveline disconnect clutch is closed and the ISG rotates the engine. If the BISG is selected to start the engine, the engine is rotated via the BISG. Method 500 proceeds to 516.

At 516, method 500 accumulates a total number of engine starts that have been initiated by each engine starting device since each engine starting device has been installed in the vehicle divided by the distance that the vehicle has traveled since each engine starting device has been installed in the vehicle. For example, if the vehicle has travelled 200,000 kilometers since it was manufactured and an ISG has started the engine 2000 times since the ISG was installed in the vehicle at the date of manufacture, method 500 stores a value of 2000/200,000. However, if a conventional starter was installed in the same vehicle at 100,000 miles and the conventional starter has initiated 700 engine starts (e.g., rotated the engine under power of the engine starting device to start the engine). In addition, method 500 modifies engine pull-down or engine stop adjustment factors. These operations are described at 340, 342, 346, 304, 308, 312, 316, 320, 324, and 328 of FIGS. 3A and 3B. Method 500 proceeds to 518.

At 518, method 500 selectively inhibits automatic engine stopping based on engine starting device durability constraints. This inhibiting may be performed as described at 332 and blocks that feed into block 332 as discussed with regard to FIG. 3A. Method 500 proceeds to 530.

At 520, method 500 judges if there is a request to automatically stop the engine. If so, the answer is yes and method 500 proceeds to 518. Otherwise, the answer is no and method 500 proceeds to exit.

At 530 method 500 determines adjustment factors for engine pull-down from engine starter durability data. The adjustment factors may be determined as shown and described at 304, 308, 312, 316, 320, 324, and 328 of FIG. 3A. Method 500 proceeds to 532.

At 532, method 500 transmits adjustment factors and engine start statistics related to use of each starting device in the system (raw and aggregated) for engine pull-down from engine starter durability data to a cloud server (e.g., external computer that is not included in the vehicle) 295. Method 500 may transmit the data via cellular network, satellite, or other known radio frequency means. Driveline data may be processed, aggregated, and collected via the vehicle controller before it is transmitted to the external server. Method 500 proceeds to 534.

At 534, method 500 receives adjustment factors for engine pull-down from a plurality of vehicles and analyzes the data. The analysis may include but is not limited to performing statistical analysis including evaluating lifespans of engine starting devices, evaluating performance of engine starting devices, and evaluating efficiency of engine starting devices. Method 500 proceeds to 536.

At 536, method 500 adjusts calibration parameter values for controllers of a plurality of vehicles. In addition, method 500 may include modification of control strategies for the various engine starting devices. The calibration parameter adjustments and control strategy modifications may be based on the analysis that is performed at 534. For example, if method 500 has determined that a lifespan of a particular engine starting device is longer than expected, then method 500 may adjust calibration parameters so that the particular engine starting device may initiate engine starts more frequently than originally was permitted. Adjustment of calibration parameters may include but is not limited to adjusting functions and relationships between variables for blocks 304, 308, 312, 316, 320, 324, and 328 of FIG. 3A. Method 500 proceeds to 538.

At 538, method 500 transmits calibration parameters to a plurality of vehicle controllers. In addition, method 500 may transmit which of a plurality of engine starting devices may be available to start the engines of the vehicles. Method 500 proceeds to 504. Steps 534-538 may be performed via external server 295.

In this way, a cloud server may process vehicle data and transmit calibration parameters and calibration strategy upgrades based on vehicle operating data to add or removed engine starting devices from a group of engine starting devices that are available to start an engine. Further, the cloud server may adjust controller parameters such that a rate of engine stop inhibiting may be increased or decreased to meet engine starter durability objectives.

Thus, the method of FIGS. 3A-3C and FIGS. 5 and 6 provides for a method for operating a vehicle, comprising: selecting a preference for a first engine starting device in response to vehicle attributes; selecting a preference for a second engine starting device in response to starting device attributes; selecting an engine starting device via a controller in response to the preference for the first engine starting device and the preference for the second engine starting device; and starting an engine via the engine starting device. The method further comprises referencing a table or a function via the preference for the first engine starting device. The method further comprises referencing the table or the function via the preference for the second engine starting device. The method includes where the engine is started based on output from the table or function. The method includes where the vehicle attributes include vehicle speed, engaged transmission gear, and propulsion pedal position. The method includes where the starting device attributes include a total number of engine starts generated divided by a distance traveled by the vehicle. The method includes where the engine starting device is selected from a group including a belt integrated starter/generator, a starter, and an integrated starter generator.

The method of FIGS. 3A-3C and FIGS. 5 and 6 also provides for a method for operating a vehicle, comprising: starting an engine via a controller and an engine starting device included in a vehicle that includes a plurality of engine starting devices, the engine starting device starting the engine in response to an engine starting device preference, the engine starting device preference based on an actual total number of engine starts initiated via a first engine starting device and a distance traveled by a vehicle since the first engine starting device was installed in the vehicle, the engine starting device preference further based on an actual total number of engine starts initiated via a second engine starting device and a distance traveled by a vehicle since the second engine starting device was installed in the vehicle. The method further comprises starting the engine via the engine starting device or the second engine starting device in response to data received from a server that is external to the vehicle. The method further comprises adjusting vehicle calibration parameters in response to the data received from the server. The method further comprises transmitting the vehicle calibration parameters from the server to the vehicle. The method further comprises generating the vehicle calibration parameters via the server.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
   selecting a preference for a first engine starting device in response to vehicle attributes;
   selecting a preference for a second engine starting device in response to engine starting device attributes, where the engine starting device attributes include a total number of engine starts generated divided by a distance traveled by the vehicle;
   selecting an engine starting device via a controller in response to the preference for the first engine starting device and the preference for the second engine starting device; and
   starting an engine via the engine starting device.

2. The method of claim 1, further comprising referencing a table or a function via the preference for the first engine starting device.

3. The method of claim 2, further comprising referencing the table or the function via the preference for the second engine starting device.

4. The method of claim 3, where the engine is started based on output from the table or function and further comprising:
   adjusting a minimum driver demand torque at which automatic engine pull-down is permitted.

5. The method of claim 1, where the vehicle attributes include vehicle speed, engaged transmission gear, and propulsion pedal position and further comprising:
   adjusting a driveline torque reserve and a transmission shifting schedule in response to engine starting devices that are available for starting the engine.

6. The method of claim 1, where the engine starting device is selected from a group including a belt integrated starter/generator, a starter, and an integrated starter generator.

7. A vehicle system, comprising:
   an internal combustion engine;
   a plurality of engine starting devices; and
   a controller including executable instructions stored in non-transitory memory that cause the controller to adjust a starting device selection procedure in response to data received from a server that is external to a vehicle that includes the internal combustion engine, and additional executable instructions stored in non-transitory memory that cause the controller to transmit data to the server, where data includes values of automatic engine stop inhibit adjustment factors.

8. The vehicle system of claim 7, where the values of automatic engine stop inhibit adjustment factors are based on engine starting device durability metrics.

9. The vehicle system of claim 8, where the engine starting device durability metrics include a total number of engine starts performed via an engine starting device since a time when the engine starting device was installed in a vehicle.

10. The vehicle system of claim 8, where the engine starting device durability metrics include a total distance traveled by a vehicle since a time when the starting device was installed in the vehicle.

11. The vehicle system of claim 7, further comprising additional executable instructions stored in non-transitory memory that cause the controller to select a preference for a first engine starting device in response to vehicle attributes.

12. The vehicle system of claim 11, further comprising additional executable instructions stored in non-transitory memory that cause the controller to select a preference for a second engine starting device in response to starting device attributes.

13. A method for operating a vehicle, comprising:
   starting an engine via a controller and an engine starting device included in a vehicle that includes a plurality of engine starting devices, the engine starting device starting the engine in response to an engine starting device preference, the engine starting device preference based on an actual total number of engine starts initiated via a first engine starting device and a distance traveled by a vehicle since the first engine starting device was installed in the vehicle, the engine starting device preference further based on an actual total number of engine starts initiated via a second engine starting device and a distance traveled by a vehicle since the second engine starting device was installed in the vehicle.

14. The method of claim 13, further comprising collecting, aggregating, and processing driveline data via the controller and transmitting the driveline data to a server that is external to the vehicle; and
   starting the engine via the engine starting device or the second engine starting device in response to data received from the server that is external to the vehicle.

15. The method of claim 14, further comprising adjusting vehicle calibration parameters in response to the data received from the server.

16. The method of claim 15, further comprising transmitting the vehicle calibration parameters from the server to the vehicle.

17. The method of claim 16, further comprising generating the vehicle calibration parameters via the server.

\* \* \* \* \*